(12) United States Patent
Balan et al.

(10) Patent No.: US 11,569,082 B2
(45) Date of Patent: Jan. 31, 2023

(54) RESTRIKE IGNITOR

(71) Applicant: Hubbell Incorporated, Shelton, CT (US)

(72) Inventors: Rajesh Balan, Chennai (IN); Jayaraj Ramasamy, Chennai (IN)

(73) Assignee: Hubbell Incorporated, Shelton, CT (US)

( * ) Notice: Subject to any disclaimer, the term of this patent is extended or adjusted under 35 U.S.C. 154(b) by 10 days.

(21) Appl. No.: 17/210,048

(22) Filed: Mar. 23, 2021

(65) Prior Publication Data

US 2022/0310379 A1     Sep. 29, 2022

(51) Int. Cl.
*H01J 61/54* (2006.01)

(52) U.S. Cl.
CPC .................... *H01J 61/54* (2013.01)

(58) Field of Classification Search
CPC ......... H01J 61/54; H05B 41/00; H05B 41/04; H05B 41/042; H05B 41/231
See application file for complete search history.

(56) References Cited

U.S. PATENT DOCUMENTS

| | | | | |
|---|---|---|---|---|
| 4,713,587 A * | 12/1987 | Byszewski | ........... | H05B 41/042 315/276 |
| 5,801,494 A * | 9/1998 | Herres | ................. | H05B 41/042 315/289 |
| 6,091,208 A * | 7/2000 | Flory, IV | ............. | H05B 41/042 315/276 |
| 2002/0074952 A1 | 6/2002 | Hudson et al. | | |
| 2005/0093477 A1 * | 5/2005 | Shi | ..................... | H05B 41/2856 315/291 |
| 2015/0319818 A1 | 11/2015 | Kahlman et al. | | |

OTHER PUBLICATIONS

PCT/US2021/026174 International Search Report and Written Opinion dated Aug. 4, 2021 (16 pages).

* cited by examiner

*Primary Examiner* — Henry Luong
(74) *Attorney, Agent, or Firm* — Michael Best & Friedrich LLP

(57) ABSTRACT

An instant restrike igniter for use with a high-intensity discharge (HID) lamp and having a bleeder circuit including a resistor in parallel with a capacitor. The bleeder circuit in electrical communication with a voltage source. A transformer is in electrical communication with the bleeder circuit. The transformer includes a first winding that is in communication with and powers a lamp and a second winding. A triggering circuit is in electrical communication with the second winding of the transformer and the bleeder circuit. The triggering circuit has a minimum holding current of 50 mA and is configured to discharge the capacitor to generate high voltage pulses that are sent, via the transformer, to the lamp to reignite the lamp after a power interruption that extinguishes the lamp.

18 Claims, 5 Drawing Sheets

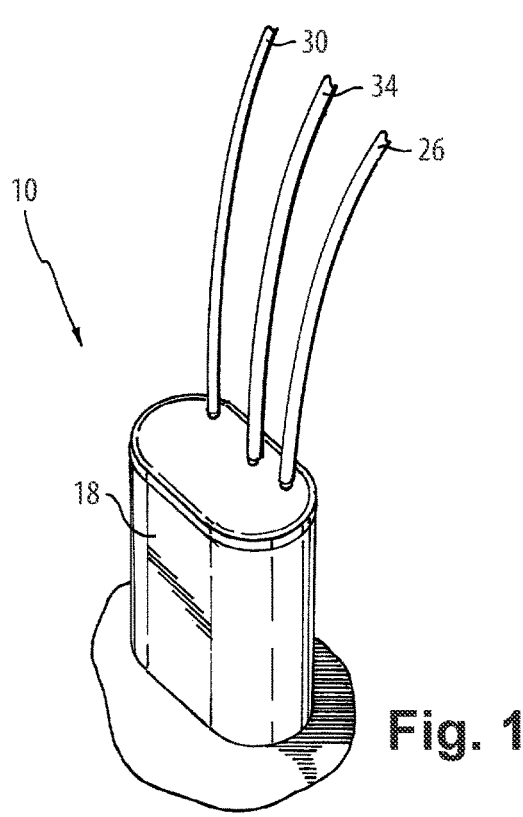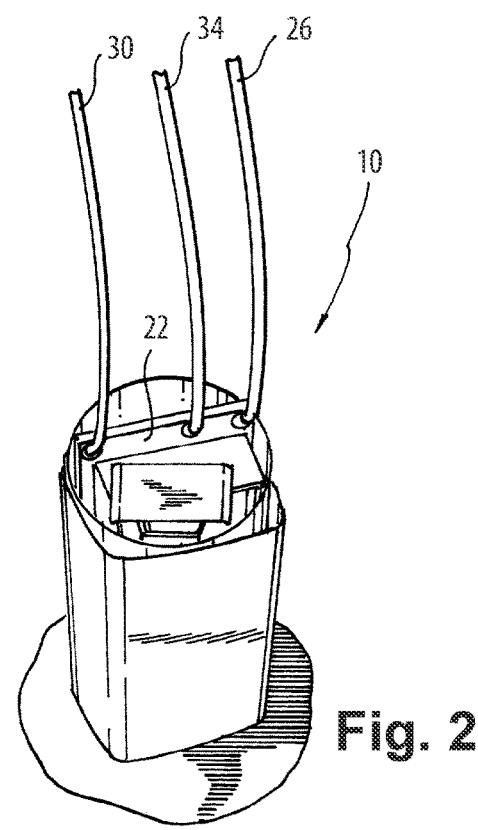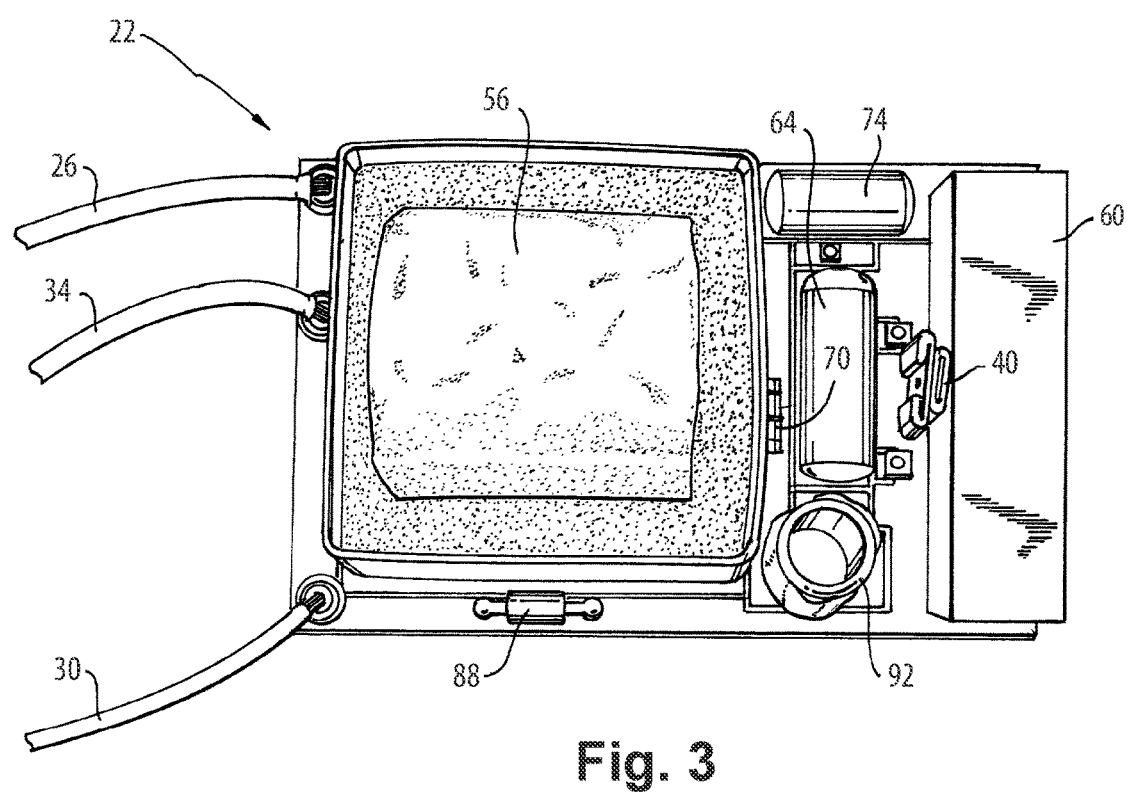

RESTRIKE IGNITOR

FIELD

Embodiments relate an ignitor for use with different types of high intensity discharge (HID) lamps and ballasts. The invention also relates to an ignitor which can be used to start a conventional HID lamp, as well as to start and hot restrike a HID lamp with a hot restrike capability.

SUMMARY

An instant restrike ignitor for use with a high-intensity discharge (HID) lamp. The instant restrike ignitor includes a bleeder circuit including a resistor in parallel with a capacitor, the bleeder circuit in electrical communication with a voltage source; a transformer in electrical communication with the bleeder circuit, the transformer including a first winding that is in communication with and powers a lamp and a second winding; and a triggering circuit in electrical communication with the second winding of the transformer and the bleeder circuit, the triggering circuit configured to discharge the capacitor to generate high voltage pulses that are sent, via the transformer, to the lamp to reignite the lamp after a power interruption that extinguishes the lamp.

In another embodiment, an instant restrike igniter for use with a high-intensity discharge (HID) lamp and having a bleeder circuit including a resistor in parallel with a capacitor. The bleeder circuit in electrical communication with a voltage source. A transformer is in electrical communication with the bleeder circuit. The transformer includes a first winding that is in communication with and powers a lamp and a second winding. A triggering circuit is in electrical communication with the second winding of the transformer and the bleeder circuit. The triggering circuit has a minimum holding current of 50 mA and is configured to discharge the capacitor to generate high voltage pulses that are sent, via the transformer, to the lamp to reignite the lamp after a power interruption that extinguishes the lamp.

In another embodiment, an instant restrike igniter for use with a high-intensity discharge (HID) lamp and having a bleeder circuit including a resistor in parallel with a capacitor. The bleeder circuit in electrical communication with a voltage source. A transformer is in electrical communication with the bleeder circuit. The transformer includes a first winding that is in communication with and powers a lamp and a second winding. A sidac is in electrical communication with the second winding of the transformer and the bleeder circuit. The sidac has a minimum holding current 50 mA and is configured to discharge the capacitor to generate high voltage pulses that are sent, via the transformer, to the lamp to reignite the lamp after a power interruption that extinguishes the lamp.

In another embodiment, a method of reigniting an arc of a lamp when there is a power interruption to the lamp that extinguishes the lamp. The method includes providing a triggering circuit in electrical communication with the lamp, providing voltage to a triggering circuit until a predetermined breakage voltage point is reached, and when the predetermined breakage voltage point is reached, discharging five or less high voltage pulses to the lamp.

Other aspects of embodiments detailed below will become apparent by consideration of the detailed description and accompanying drawings.

BRIEF DESCRIPTION OF THE DRAWINGS

FIG. 1 is a perspective view of a restrike ignitor according to one embodiment.

FIG. 2 is a perspective view of the restrike ignitor of FIG. 1 with a housing removed.

FIG. 3 is a top view of a printed circuit board assembly of the restrike ignitor of FIG. 1.

DETAILED DESCRIPTION

Before any embodiments are explained in detail, it is to be understood that the application is not limited in its application to the details of construction and the arrangement of components set forth in the following description or illustrated in the following drawings. Other embodiments, than those described below, are capable of being practiced or of being carried out in various ways.

Figure 4:
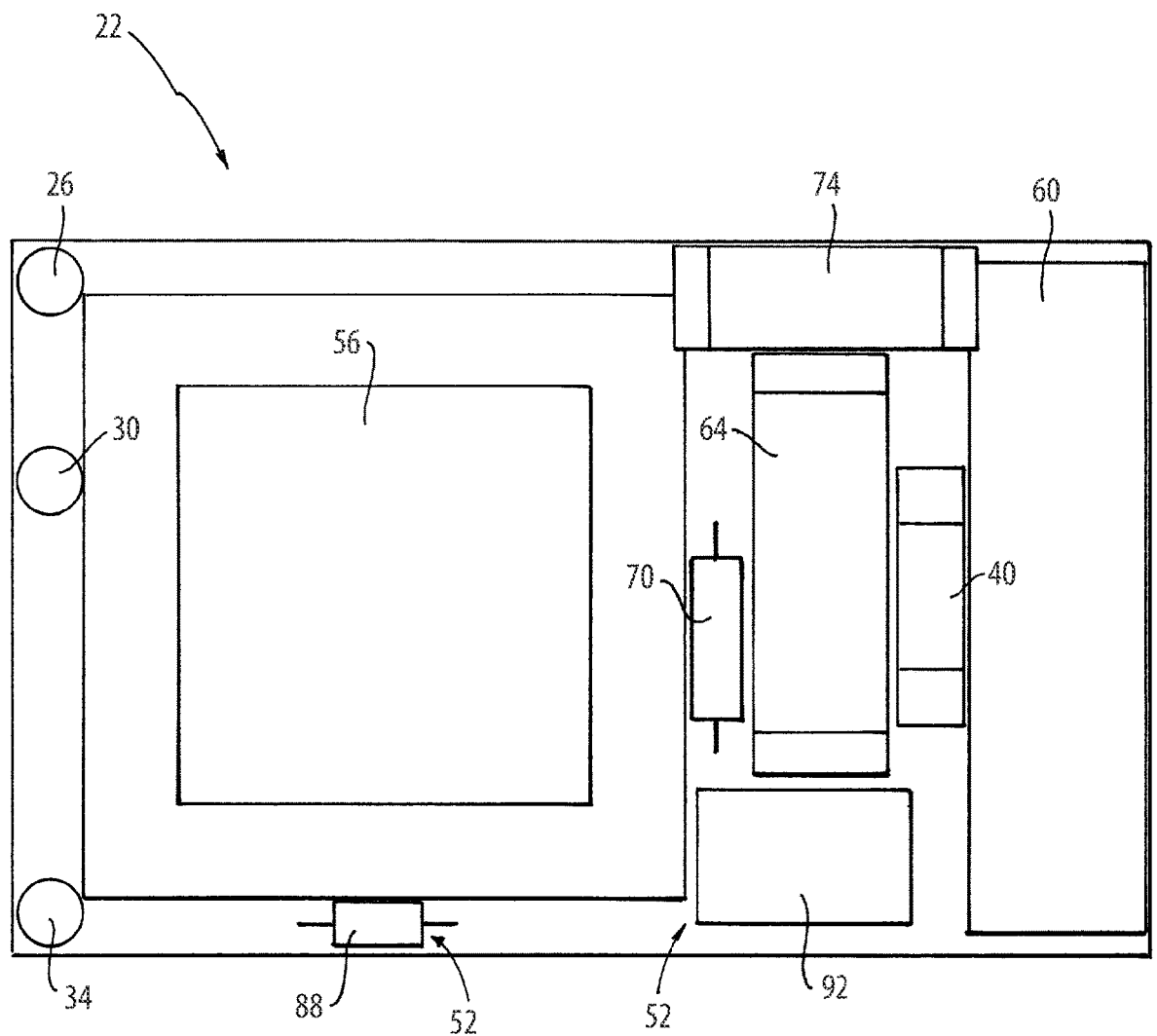
FIG. 4 is an assembly view of a printed circuit board of the restrike ignitor of FIG. 1.
Figure 5:
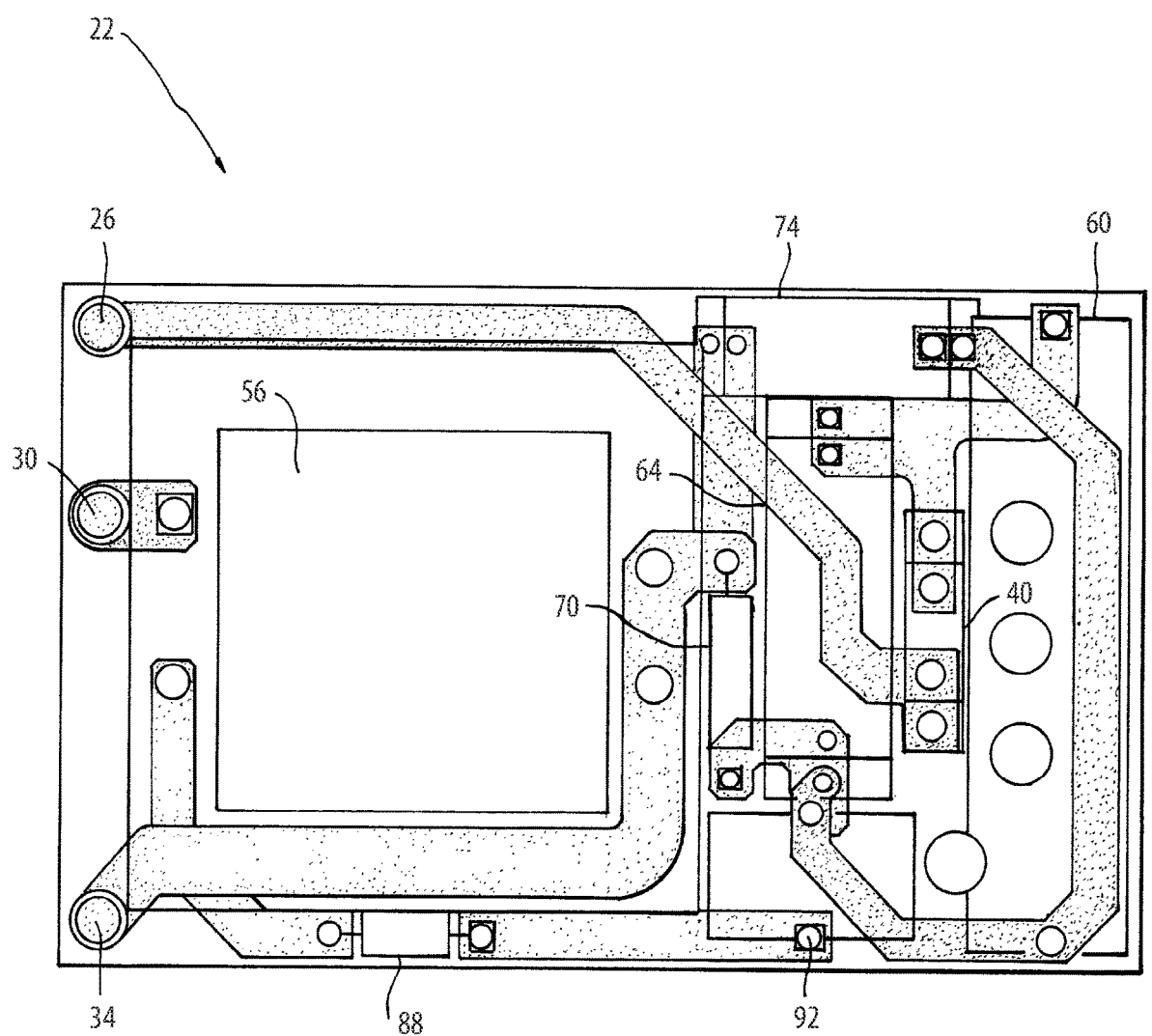
FIG. 5 is another view of a printed circuit board assembly of the restrike ignitor of FIG. 1.
Figure 6:
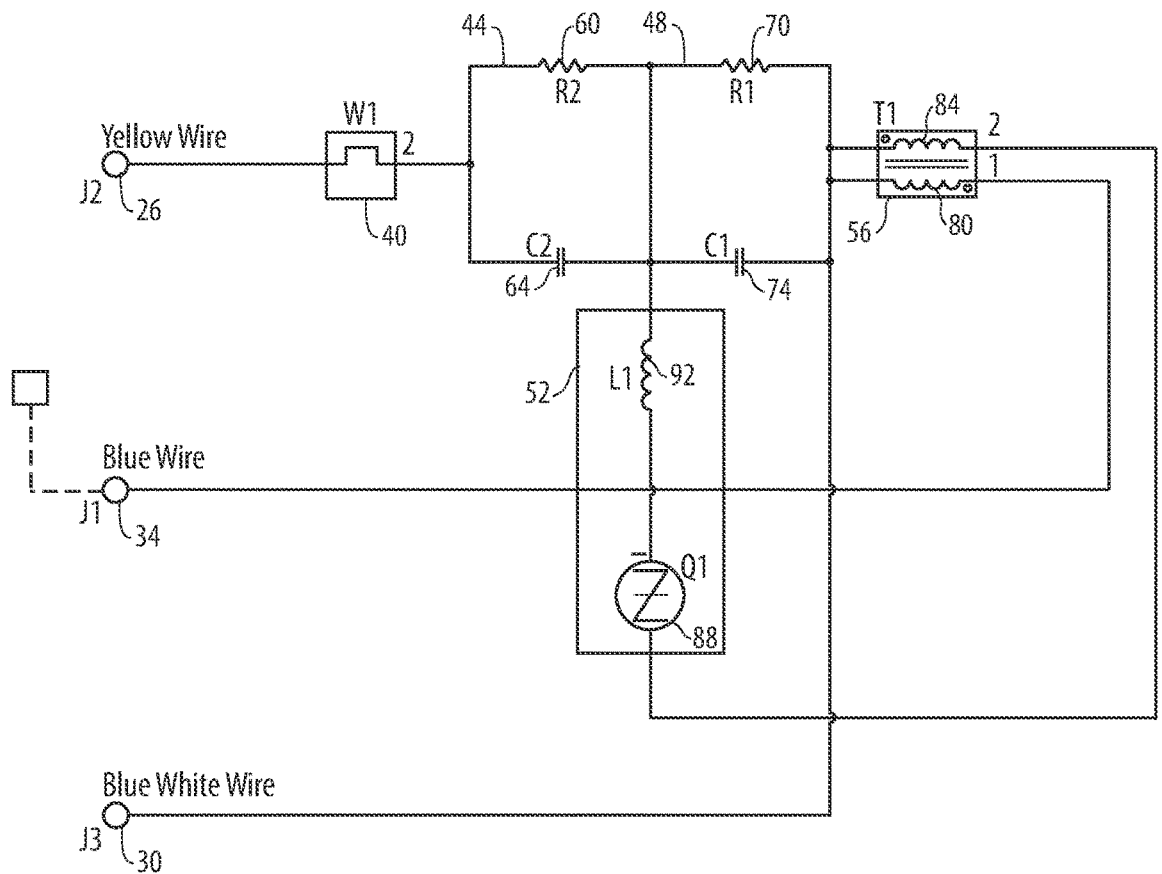
FIG. 6 is a schematic of the electronic circuit of the restrike ignitor of FIG. 1.
Figure 7:
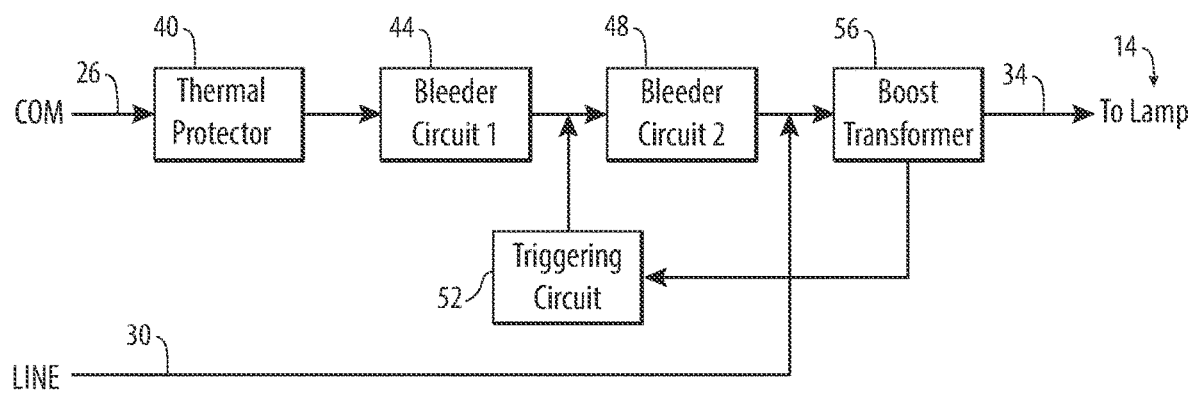
FIG. 7 is block level diagram of the electronic circuit of the restrike ignitor of FIG. 1.
Figure 8A:
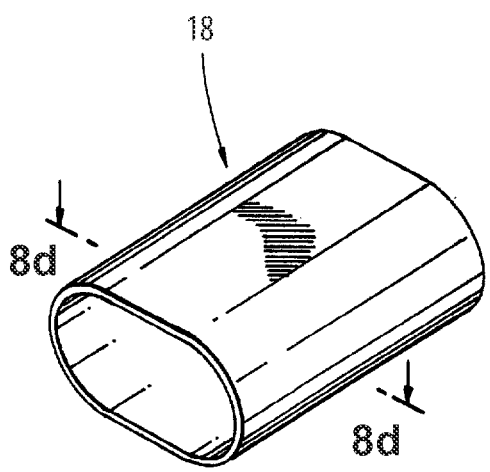
FIG. 8a illustrates a perspective view of the housing of the restrike ignitor of FIG. 1.
Figure 8B:
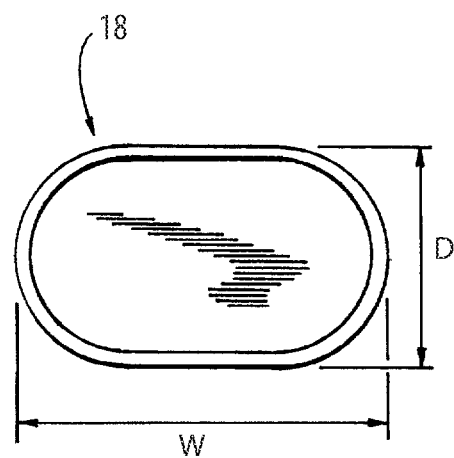
FIG. 8b illustrates a top view of the housing of the restrike ignitor of FIG. 1.
Figure 8C:
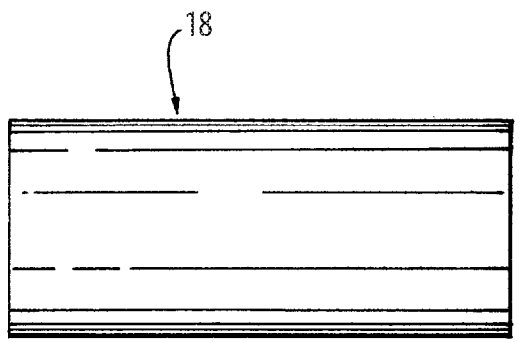
FIG. 8c illustrates a side view of the housing of the restrike ignitor of FIG. 1.
Figure 8E:
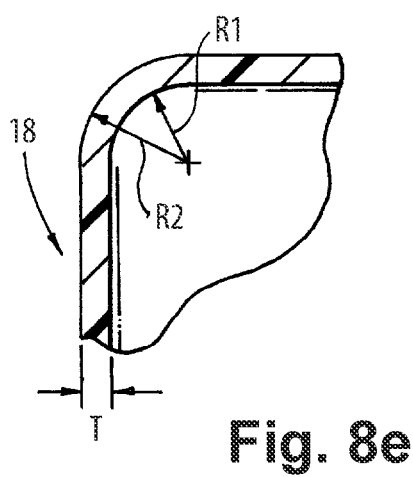
FIG. 8e illustrated an enlarged view of a portion of the housing shown in FIG. 8d.
Figure 8D:
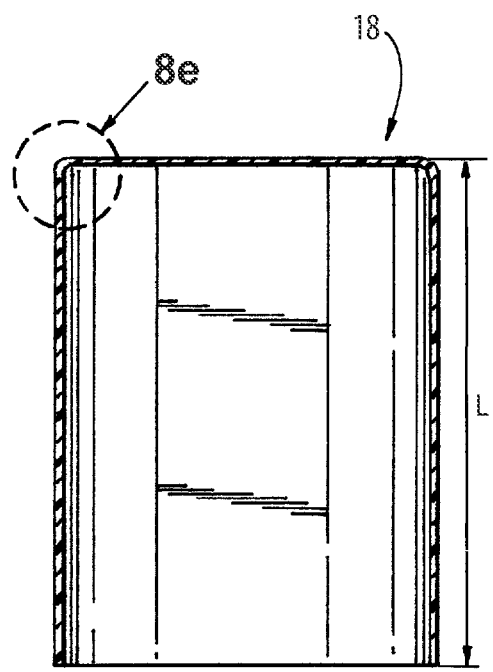
FIG. 8d illustrates another side view of the housing of the restrike ignitor of FIG. 1.

FIGS. 1 and 2 shows a restrike ignitor 10 according to one embodiment. The restrike ignitor 10 is capable of generating igniting voltage of between 4 kV and 5 kV to ignite a high-intensity discharge (HID) lamp 14 (FIG. 6) such as a high-pressure sodium (HPS) lamp of 70 W, 100 W, and 150 W. As shown the restrike ignitor 10 includes a housing 18, a printed circuit board 22 positioned within the housing 18, and a plurality of wires 26, 30, 34 extending from the printed circuit board 22. Each of the wires 26, 30, 34 is in electrical communication with the printed circuit board 22. In the illustrated embodiment, the housing 18 is substantially ovular and encloses the printed circuit board 22 (FIGS. 8a-8e). As shown, the housing 18 has a length L, a width W, a depth D, and a wall thickness T. In the illustrated embodiment, the length L may measure 88 mm, the width W may measure 66 mm, the depth D may measure 38 mm, and the wall thickness T may measure 0.6 mm. In other embodiments, the length L, the width W, the depth D, and the wall thickness T may have other suitable dimensions. Further, as shown, a bottom wall of the housing and a side wall of the housing may be coupled by rounded edges. In the illustrated embodiment, an interior radius R1 of the edge may be 0.6 mm, while an exterior radius R2 of the rounded edges may be 1.2 mm. The interior radius R1 and exterior radius R2 may have other suitable dimensions in other embodiments. In still other embodiments, the edges may not be rounded. Also, the housing 18 is constructed from an aluminum material in the illustrated embodiment. One of the plurality of wires 26 (e.g., a first wire) is configured to be electrically coupled to a common connection of an alternating current (AC) input, one of the plurality of wires 30 (e.g., a second wire) is configured to be electrically coupled to a hot line connection of AC input, and one of the plurality of wires 34 (e.g., a third wire) is configured to be electrically coupled to the HID lamp 14. The third wire 34 (and therefore the lamp) is in a series circuit relationship with a ballast 38 (shown schematically in FIG. 6) via the first and second wires 26, 30. With respect to FIGS. 3-7, the printed circuit board 22 of the restrike ignitor includes a thermal protector 40, a first bleeder circuit 44, a second bleeder circuit 48, a triggering circuit 52, and a transformer 56.

The thermal protector 40 is in electrical communication with the first wire 26, the second wire 30, and the first and second bleeder circuits 44, 48. The thermal protector 40 has an opening temperature of 130° C. The thermal protector 40 has a bimetal snap-action disc. When the temperature of this disc reaches 130° C., it snaps open, resulting in an open circuit. This temperature is reached during a fault condition, caused by either an increase in ambient temperature, an increase in current flowing through the disc, or a combination of both an increase in ambient temperature and an increase in current flowing through the disc. After the thermal protector 40 breaks the circuit, the system cools and the thermal protector 40 automatically resets allowing power to be restored to the circuit.

The first bleeder circuit 44 is in electrical communication with first wire 26, the second wire 30, the thermal protector 40, and the transformer 56. The first bleeder circuit 44 includes a resistor 60 and a capacitor 64 that are connected in parallel. The function of bleeder resistor 60 in this circuit is to discharge the capacitor 64 as a safety measure whenever the power is switched off and to improve the voltage regulation by providing a minimum load resistance. The discharged voltage is passed through to the transformer 56. In the illustrated embodiment, the resistor 60 has a resistance of 1K Ohms (with a power rating of 15 W) and the capacitor 64 has a capacitance of 3.3 µF per 450 Vic (e.g., equivalent AC voltage being 3.3 µF per 230 $V_{AC}$). In additional or alternative embodiments, the resistor 60 and capacitor 64 may have other suitable values.

The second bleeder circuit 48 is in electrical communication with the second wire 30, the first wire 26, the thermal protector 40, and the transformer 56. The second bleeder circuit 48 includes a resistor 70 and a capacitor 74 that are connected in parallel. The function of bleeder resistor 70 in this circuit is to discharge the capacitor 74 as a safety measure whenever the power is switched off and to improve the voltage regulation by providing a minimum load resistance. The discharged voltage is passed through to the transformer 56. In the illustrated embodiment, the resistor 70 has a resistance of 470K Ohms (with a power rating of 0.5 W) and the capacitor 74 has a capacitance of 1 µF per 450 Vic (e.g., equivalent AC voltage being 1 µF per 230 $V_{AC}$). In additional or alternative embodiments, the resistor 70 and capacitor 74 may have other suitable values.

The transformer 56 is in electrical communication with the first, second, and third wires 26, 30, 34 and the second bleeder circuit 48. The transformer 56 receives input from the second bleeder circuit 48 via the second wire 30. The transformer 56 includes a first winding 80 that is in electrical communication with the third wire 34, and therefore the lamp 14, and a second winding 84 that is in electrical communication with a sidac 88 of the triggering circuit 52. In the illustrated embodiment, the inductance of the first winding 80 is twenty times greater than the inductance of the second winding 84. Accordingly, in the illustrated embodiment, the inductance of the first winding 80 is 20 mH and the inductance of the second winding 84 is 20 µH.

The triggering circuit 52 is in electrical communication with the transformer 56 and the second bleeder circuit 48. The triggering circuit 52 includes the sidac 88 and an inductor 92 that are connected in series. An input of the sidac 88 is in communication with the transformer 56 and the output of the sidac 88 is in communication the inductor. An output of sidac 88 is connected to the inductor, which is used for inter stage coupling and to reduce the noise. In the illustrated embodiment, the inductor has an inductance of 1 uH, although inductors having another suitable inductance may be used. When the voltage exceeds a breakover voltage point (e.g., 120V) of the sidac 88, the sidac 88 switches through a negative resistance region to a low on-state voltage. Conduction continues until the current is interrupted or drops below the minimum holding current of the device. In the illustrated embodiment, the minimum holding current of the triggering circuit 52 is 50 mA because the minimum holding current of the sidac is 50 mA.

In use, voltage from the second wire 30 moves to the transformer 56 and then via the first winding 80 to the lamp 14 and the second winding 84 to the triggering circuit 52. More specifically, voltage enters the second wire 30 and moves across the capacitor 74 of the second bleeder circuit 48. Voltage from the second bleeder circuit 48 moves via the first winding 80 to the lamp 14 and via the second winding 84 to the sidac 88. If there is a power interruption to the lamp 14, voltage continues to move to the triggering circuit 52 until the voltage exceeds the breakover voltage point, which causes the triggering circuit 52 to send high voltage pulses to the transformer 56 and then via the first winding 80 to the lamp 14 and the second winding 84 to the triggering circuit 52. That is, voltage moving to the sidac 88 increases until it reaches the breakover voltage point (e.g., 120V), which causes the sidac 88 to switch through a negative resistance region to a low on-state voltage thereby causing the capacitor 74 of the second bleeder circuit 48 to discharge a high voltage pulse (e.g., a pulse of 4 KV to 5 KV) to the transformer 56. The sidac 88, via discharge of the capacitor 74 of the second bleeder circuit 48, generates voltage, and therefore pulses, until the current is interrupted or drops below the minimum holding current of the sidac 88. The minimum holding current (e.g., 50 mA) of the device is such that the number of pulses is controlled to five or less, which importantly complies with the relevant IEC standard. In particular, IEC60927 requires that a lamp be reignited using less than 5 pulses. Accordingly, if power is interrupted and the lamp 14 gets extinguished, the sidac 88 generates five pulses or less to restrike the lamp arc, which is less pulses than conventional instant restrike ignitors. This is because the holding current of conventional restrike ignitors is larger (e.g., 150 mA) than the minimal holding current of the present sidac 88 and therefore number of pulses required to restrike conventional ignitors is greater too (e.g., about 8 pulses).

The thermal protector 40 and the bleeder circuits 44, 48 are safety measures. That is, when the opening temperature of the thermal protector 40 is exceeded, the circuit is opened until the temperature or current through the system is reduced. If the thermal protector 40 opens while sidac 88 is in conduction, the voltage discharge moves through the second winding 84 to the sidac 88 and a single pulse will be generated at the output of transformer 56. Accordingly, a first pulse will move via the first winding to the lamp 14. If the thermal protector 40 opens while sidac 88 is not in conduction, the voltage discharge moves the through the resistors 60, 70 of the first and second bleeder circuits 44, 48 to the transformer 56. Accordingly, voltage from the first and second bleeder circuits 44, 48 moves via the first winding to the lamp 14 and via the second winding to the sidac 88.

Various features and advantages of the invention are set forth in the following claims.

What is claimed is:

1. An instant restrike ignitor for use with a high-intensity discharge (HID) lamp, the instant restrike ignitor comprising:
   a bleeder circuit including a resistor in parallel with a capacitor, the bleeder circuit in electrical communication with a voltage source;
   a transformer in electrical communication with the bleeder circuit, the transformer including a first winding that is in communication with and powers the HID lamp and a second winding; and
   a triggering circuit in electrical communication with the second winding of the transformer and the bleeder circuit, the triggering circuit having a minimum holding current of 50 mA and configured to discharge the capacitor to generate high voltage pulses that are sent, via the transformer, to the HID lamp to reignite the HID lamp after a power interruption that extinguishes the HID lamp,
   wherein the minimum holding current of 50 mA controls the number of high voltage pulses that are sent to the HID lamp to be five pulses or less.

2. The instant restrike ignitor of claim 1, wherein the triggering circuit includes a sidac in electrical communication with the second winding of the transformer and the bleeder circuit, the sidac defining the minimum holding current of the triggering circuit.

3. The instant restrike ignitor of claim 2, wherein a breakover voltage point of the sidac is 120 V.

4. The instant restrike ignitor of claim 2, wherein the triggering circuit further includes an inductor connected in series with the sidac, an input of the sidac being in electrical communication with the transformer and the output of the sidac being in electrical communication with the inductor.

5. The instant restrike ignitor of claim 1, wherein the bleeder circuit is a first bleeder circuit and further comprising a second bleeder circuit in electrical communication with the first bleeder circuit, both the first and the second bleeder circuits being in electrical communication with a thermal protector.

6. The instant restrike ignitor of claim 1, further comprising a thermal protector in electrical communication with the bleeder circuit, the thermal protector having an opening temperature, wherein the thermal protector opens when the thermal protector reaches the opening temperature.

7. The instant restrike ignitor of claim 6, wherein the opening temperature is 130 degrees Celsius.

8. An instant restrike ignitor for use with a high-intensity discharge (HID) lamp, the instant restrike ignitor comprising:
   a bleeder circuit including a resistor in parallel with a capacitor, the bleeder circuit in electrical communication with a voltage source;
   a transformer in electrical communication with the bleeder circuit, the transformer including a first winding that is in communication with and powers the HID lamp and a second winding; and
   a sidac having an input and an output, the input being in electrical communication with the second winding of the transformer and the output being in electrical the bleeder circuit, the sidac having a minimum holding current 50 mA and configured to discharge the capacitor to generate high voltage pulses that are sent, via the transformer, to the HID lamp to reignite the lamp after a power interruption that extinguishes the HID lamp.

9. The instant restrike ignitor of claim 8, wherein the sidac generates five pulses or less to reignite the lamp.

10. The instant restrike ignitor of claim 8, wherein a breakover voltage point of the sidac is 120 V.

11. The instant restrike ignitor of claim 8, wherein an inductor is connected in series with the sidac, the output of the sidac in electrical communication with the bleeder circuit via the inductor.

12. The instant restrike ignitor of claim 8, wherein the bleeder circuit is a first bleeder circuit and further comprising a second bleeder circuit in electrical communication with the first bleeder circuit, both the first and the second bleeder circuits being in electrical communication with a thermal protector.

13. The instant restrike ignitor of claim 12, wherein the second bleeder circuit includes a resistor in parallel with a capacitor.

14. The instant restrike ignitor of claim 8, further comprising a thermal protector in electrical communication with the bleeder circuit, the thermal protector having an opening temperature, wherein the thermal protector opens when the thermal protector reaches the opening temperature.

15. The instant restrike ignitor of claim 14, wherein the opening temperature is 130 degrees Celsius.

16. A method of reigniting an arc of a lamp when there is a power interruption to the lamp that extinguishes the lamp, the method comprising:
   providing a triggering circuit in electrical communication with the lamp;
   providing voltage to the triggering circuit until a predetermined breakage voltage point is reached; and
   when the predetermined breakage voltage point is reached, discharging high voltage pulses to the lamp until a minimum holding current of 50 mA is reached, the minimum holding current of 50 mA controls the number of high voltage pulses that are sent to the HID lamp to be five pulses or less.

17. The method of claim 16, wherein the triggering circuit has sidac with the minimum holding current of 50 mA.

18. The method of claim 16, wherein discharging voltage pulses to the lamp, includes discharging a capacitor in communication with the triggering circuit to discharge the five or less high voltage pulses to the lamp.

* * * * *